March 20, 1973     R. M. JENIFER ET AL     3,721,974
MESSAGE DISPLAY SYSTEM AND PICTORIAL PROGRAMMER THEREFOR
Filed May 13, 1971     8 Sheets-Sheet 1
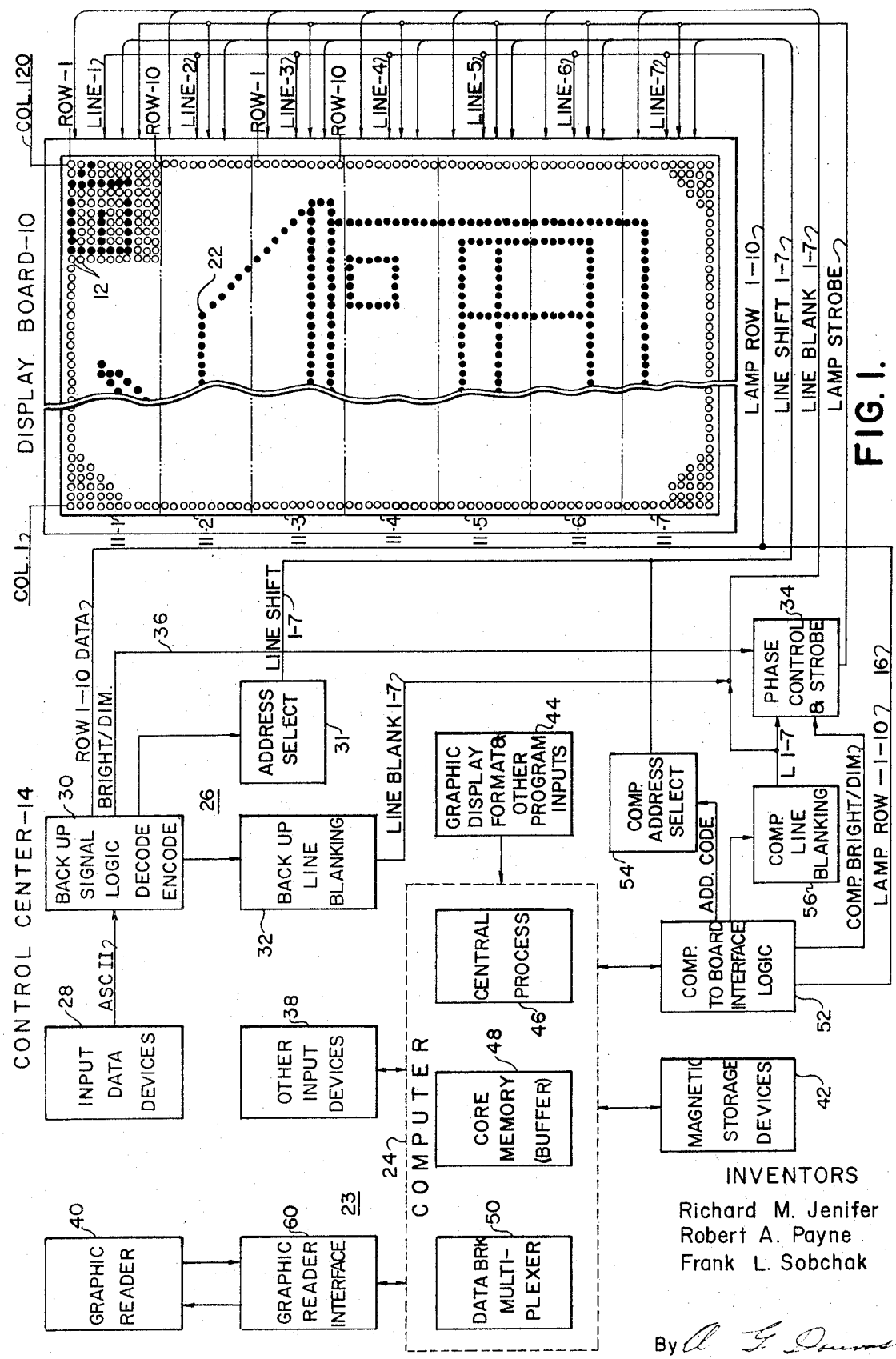
FIG. I.
INVENTORS
Richard M. Jenifer
Robert A. Payne
Frank L. Sobchak
By _____
Attorney INVENTORS
Richard M. Jenifer
Robert A. Payne
Frank L. Sobchak By
Attorney March 20, 1973  R. M. JENIFER ET AL  3,721,974
MESSAGE DISPLAY SYSTEM AND PICTORIAL PROGRAMMER THEREFOR
Filed May 13, 1971  8 Sheets-Sheet 3

INVENTORS
Richard M. Jenifer
Robert A. Payne
Frank L. Sobchak

By
Attorney

March 20, 1973  R. M. JENIFER ET AL  3,721,974
MESSAGE DISPLAY SYSTEM AND PICTORIAL PROGRAMMER THEREFOR
Filed May 13, 1971  8 Sheets-Sheet 4

INVENTORS
Richard M. Jenifer
Robert A. Payne
Frank L. Sobchak

By
Attorney

INVENTORS
Richard M. Jenifer
Robert A. Payne
Frank L. Sobchak

By *A. G. Douglas*
Attorney

INVENTORS
Richard M. Jenifer
Robert A. Payne
Frank L. Sobchak

By
Attorney

United States Patent Office 3,721,974
Patented Mar. 20, 1973

3,721,974
MESSAGE DISPLAY SYSTEM AND PICTORIAL PROGRAMMER THEREFOR
Richard M. Jenifer, Chicago, Robert A. Payne, Des Plaines, and Frank L. Sobchak, Chicago, Ill., assignors to Stewart-Warner Corporation, Chicago, Ill.
Filed May 13, 1971, Ser. No. 143,023
Int. Cl. G09f 9/32
U.S. Cl. 340—339  2 Claims

ABSTRACT OF THE DISCLOSURE

A message display system in which alpha numeric messages and pictorial or graphic representations are formed. A display board formed of a matrix of display elements such as lamps is controlled by means of digital signals. While the alpha numeric messages are read into the system by well known input means, the pictorial representations are formed by a unique device which optically views a drawing or printed picture and creates digital signals which are processed to display the drawing or printed picture on the display board or stored for subsequent display.

BACKGROUND OF THE INVENTION

Field of the invention

This invention relates to display systems which are operable by digital techniques, and more particularly to display systems which are operable to display pictorial or graphic representations on a display board. Furthermore, this invention relates to unique apparatus for optically viewing a desired graphic representation and creating digital signals in accordance therewith which can be processed to actuate the display board to form the desired pictorial representation.

Description of the prior art

While there have been a number of display systems in the prior art which were capable of displaying pictorial representations on the display board, the systems by which the electric signals were produced for controlling the board to form the display represented a rather large monetary investment either in the hardware required to produce the representation or in the preparation of programs for controlling the system to form the pictorial representations. One type of system is shown in U.S. Pat. 3,273,140, issued to J. Y. Foster et al. wherein a picture is projected onto a matrix of photocells, each of which requires a hardware connection to a respective lamp on the display board matrix. The lamps on the board are actuated in accordance with the light and dark areas of the picture projected onto the photocells to form the representation. It may be seen, however, that this is a very expensive system requiring an enormous amount of wiring, especially if the viewing system is located at some distance from the display board itself as is the desired situation in most applications such athletic stadiums and the like.

Improved systems that have the capability of showing graphic representations may be found in U.S. patent application Ser. No. 626,038, filed Mar. 27, 1967 by Gardberg et al., now U.S. Pat. No. 3,594,752 and U.S. patent application Ser. No. 41,310, filed May 28, 1970 by Robert A. Payne, now U.S. Pat. No. 3,638,215. In the systems shown in these latter cases, the pictorial representations are controlled by digital signal programs formed in address and display data by an operator and stored in storage means such as magnetic tape or punched paper tape for subsequent reading into the display system. An operator prepares the program by feeding the address and display data into the storage means by appropriate coding input devices in accordance with the desired graphic representation and the data is subsequently read out to form the display on the board. Although such systems represented a material reduction in the cost of hardware required for the display, a sizeable investment is required in the formation of data programs. After drawing the desired pictorial display, an operator must translate the picture into appropriate address and display data codes for storage and subsequent readout to the display board. Thus, the investment in the program can be quite costly, especially if an animated pictorial representation is desired which is formed by a number of rapidly sequenced pictures programmed into the storage means.

SUMMARY OF THE INVENTION

In the system of the present invention the lower cost hardware of the latter two above mentioned cases is preserved, but a much simpler and more economical means for producing the data signals is provided. The system utilizes a device which scans a picture drawn or printed on the program document and automatically prepares electric signals in accordance with the graphic representation. The signals are read into a storage device where they are then formatted and transferred either to the display board for immediate display or to storage means such as magnetic tape for subsequent readout and display on the board.

To be more specific, a system for forming a desired display pattern on a display board having display elements arranged in an ordered group embodying the teachings of this invention comprises a program document having a like arranged group of markings which may be sensed by optical means or the like, the document having a replication of the desired pattern formed thereon covering the markings required to form the display pattern. A program document reader is provided which comprises means for receiving an inserted program document, means for sensing an ordered portion of the markings on the marking document to provide electric signals in accordance with the covered and uncovered markings thereon and means for causing relative movement between the sensing means and said program document to sequentially sense each ordered portion of the markings. Means responsive to said electric signals then operate the display elements on the display board to form the desired pattern. Preferably, the sensing means in the system comprises a series of photocells aligned to optically view simultaneously a single column of the matrix arranged markings and light source means for illuminating the single column of markings.

It is also a feature of this invention to provide a program document reader for providing data signals in accordance with a program document having sensible markings arranged in a group corresponding to the group of display elements on the display board and having a replication of the desired pattern formed thereon covering the markings required to form the display pattern. The program document reader comprises means for receiving an inserted document, means for sensing an ordered portion of the markings on said program document to provide electric signals in accordance with the covered and uncovered markings thereon, and means for causing relative movement between the sensing means and the program document to sequentially sense each ordered portion of said markings thereon.

In addition the program document reader includes special means for maintaining accurate alignment for the program document as it is inserted and moved through the reader including at least one wheel having a series of equispaced sprockets around the periphery thereof to engage a series of equispaced sprocket holes along the length of the program document, means for driving the sprocket wheel to move the program document through the scanning means if one has been inserted, and means for causing the wheel to stop with a sprocket positioned in a reference position to act as a stop for the leading edge of a next inserted program document. Another feature of this invention is the provision of a specially designed program document on which a desired pictorial representation may be drawn or printed for scanning by the program document reader to produce electrical signals in accordance with the desired pictorial representation. Such a program document comprises a light conducting sheet, opaque printing on the sheet forming a matrix of light conducting markings in accordance with the matrix of display elements on the display board and a surface on the sheet adapted to hold an opaque pattern replication thereon covering the light conducting markings forming the desired pattern.

Other objects, advantages and features of this invention will be better understood by a further reading of this specification especially when taken in conjunction with the accompanying drawings.

BRIEF DESCRIPTION OF THE DRAWINGS

FIG. 1 is a system diagram showing the interconnection of the basic system components including a fragmentary portion of the display board;

GENERAL DESCRIPTION OF DISPLAY SYSTEM

Figure 6:
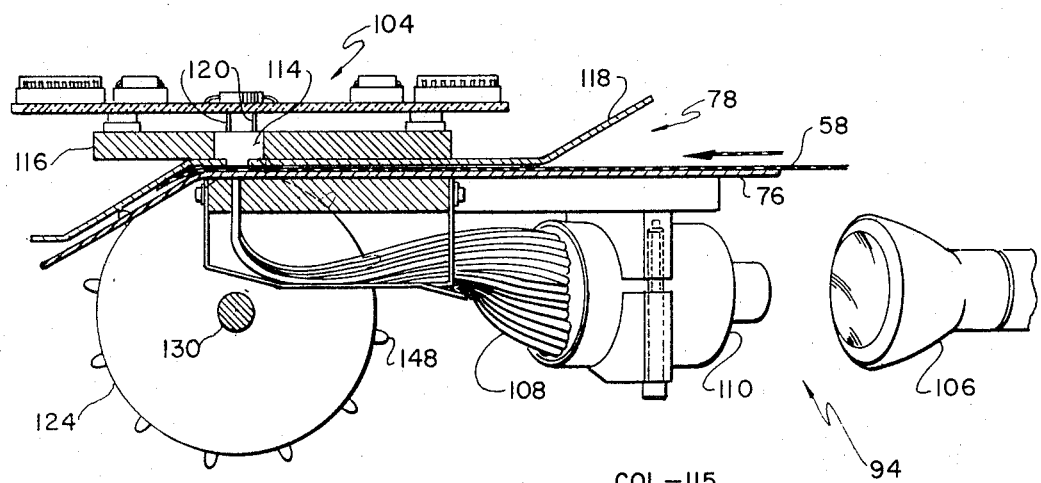
FIG. 6 is a view of the light transmission array and its relationship to the program document.

First referring to FIG. 1, there is shown in block diagram form a preferred embodiment of a display system incorporating the teachings of this invention. The system is similar to that disclosed in the aforementioned Payne application in that the display board 10 is made up of a number of addressable lines (Line–1, Line–2, etc.) each of which is in turn made up of a matrix display elements such as lamps 12 arrnaged in vertical columns (Col. 1 through 120) and horizontal rows (Row 1 through 10). Although a single array of seven vertically stacked Lines 1 through 7 are shown and described in this application, it is to be understood that the teachings herein are equally applicable to a system which has a display board made up of two side-by-side arrays of seven vertically stacked addressable lines so as to make up a doubly wide board formed of fourteen addressable line matrices.

The system is designed such that the data is read into the right side of the display board (as viewed in FIG. 1), one line at a time and ordinarily in sequence from the top line, Line–1 to the bottom line, Line–7. The data for each line is entered and shifted to the left in a column-by-column manner until the complete message for that line has been entered and properly spaced in the horizontal direction. This procedure is used whether an alpha numeric message as shown in Line–1 is portrayed or a graphic display such as the configuration of a house 22 as shown in Lines–2–7 is being portrayed. However, any Line–1–7 is separately addressable so that data can be inserted in any desired sequence, but the sequential line-by-line procedure is preferred because it facilitates the formatting of message displays. Other sequences can, of course, be used if desired without deviating from the basic teachings of this invention.

As described in the aforementioned applications, the lamps 12 forming the matrix of each Line–1 through 7 are controlled by ten shift registers (not shown), one each of which corresponds to a particular Row 1 through 10 forming the line. Furthermore, each of the shift registers has one hundred and twenty stages, each one corresponding to a vertical column COL 1 through 120 of display lamps. Thus, data may be read into any desired Line–1 through 7 by addressing the particular line and shifting display data into the corresponding shift registers until the data is located in the proper column to form the desired display pattern. More specifically, display data from the control center 14 is transmitted to the inputs of all of the shift registers in the display board over Lamp Row 1 through 10 conductors, but is shifted into and through the shift registers of the addressed Line by means of shift pulses provided on the appropriate Line Shift 1 through 7 conductor. The lamps may be controlled to light each time the data is shifted one stage in the registers to give a traveling message effect. Alternatively, the lamps may be controlled to light after the data has been properly located at the desired position along the line to give a copy changer effect. This is controlled by means of strobe pulses on the Lamp Stroke 1 through 7 conductors which are gated with the data in the shift register stages to light the lamps.

As previously mentioned, the electric signals for operating the display board are derived at the control center 14 which includes a primary system 23 for controlling the board by a general purpose computer 24, and a backup system 26 for controlling the board by an operator's console in the event of a malfunction of the primary system 23. Although the primary concerns of this invention dealing with the portrayal of graphic representation pertains to the computer system 23 for operating the board, an initial description will be given of the backup system 26 in preparation for the description of the computer system.

The backup system 26 operates similarly to the noncycling mode of operation described in the aforementioned Payne application in which the data is entered into the addressed Line of the display board in lamp code words containing ten parallel bits representing the on and off conditions of the lamp forming a single column. The lamp code data bits are shifted stage-by-stage as each following lamp code word is entered until it appears at the shift register stages corresponding to the appropriate horizontal location of the desired pattern. The input data contains an address representative only of the particular Line 1 through 7 at which the display is to appear. No address data corresponding to the desired column appears as the horizontal positioning is accomplished by the input of appropriate spacing data after the alpha-numeric data has been inserted for that line.

The input data from the input data device 28 is provided in appropriate code notation, such as ASCII, to a backup signal logic decoding and encoding circuit 30. The address data which always precedes the display character data from the input device causes the address select circuit 31 to address the appropriate line by opening up the appropriate Line Shift conductor 1 through 7, for the transmission of Line Shift pulses. These pulses react the lamp code data bits into the board shift registers of the addressed Line and shift them from stage to stage in a well known manner. Thus, although the lamp code data on the Row 1 through 10 conductors are present at the input of all of the shift registers in all of the Lines 1 through 7, the only Line that receives the data and shifts it through its shift registers is that line which receives shift pulses over the appropriately opened Line Shift 1 through 7 conductor from the address select circuit 31. As in the previously mentioned applications, the address code from the input device is in the form of a special character such as an asterisk * followed by a number representing the desired Line. The special character notifies that the next following data pertains to the address (which is not to be displayed) and the number data causes the address select circuit to open an appropriate gate therein for Line Shift pulses to be transmitted over the appropriate Line Shift 1 through 7 conductors.

The display character data following the address data from the input device 28 is decoded in the backup signal logic and encoded into the appropriate lamp coded words for forming the desired character on the display board line matrix. Thus, each display character as it is provided to the signal logic 30 in ASCII code from the input device, is decoded and changed into lamp code signal words for admission to the board.

The encoded signal in the backup logic converts each decoded character into a 5 x 7 dot matrix character which is transmitted to the display board in the form of five ten-bit words, each of which represents a column forming the character plus an additional column forming a space before the next character. For example, the letter "E" appearing at Line 1 of the display board 10 shown in FIG. 1 is formed by five succeeding 10-bit words, the first of which includes a one condition in bits 1 through 7 with zeros in bits 8 and 9, the second, third and fourth words each having a one condition in bits 1, 4 and 7 while the fifth word has a one condition in bits 1 and 7 only. As each 10-bit word appears at the input to the shift register, the signal logic also sends a shift pulse over the Line Shift 1 conductor going only to Line 1 to enter the 10-bits of the word into the first stages of the Line 1 shift registers. Thus, five shift pulses are applied thereto to form the display character, and then one additional shift pulse is automatically generated by the signal logic to form a single column space before the next five by seven matrix character is formed. The spacing in between line is provided by the unlit lamps in Rows 8, 9 and 10 of each Line which are generally not coded with a 1 in the 10-bit words forming the lamp codes for the alpha-numeric characters. Since each display character takes up six columns (5 for the character and a 1 column space) twenty characters may be entered into each line on the board. If a lesser number of characters is to be entered into a line, an appropriate number of six column blanks space characters may be entered from the input device to locate the encoded display characters at a desired horizontal location along the line.

When an appropriate number of display and space characters have been entered to complete the line and there are additional characters to be displayed on the next succeeding line, the input data must contain appropriate data for addressing the next succeeding line. This can be done either by entering the special address character plus the next number address, or in the event a teletypewriter is being used as the input device, a carriage return character can be used, which automatically causes the address select 30 to address the next succeeding Line Shift 1 through 7 conductor.

The input data may also contain information pertaining to whether the display board line is to be lit after all of the lamp code signals have been entered for copy charge mode operation or if the lamps are to be lit after each column shift for traveling message mode display. This is accomplished by the backup line blanking circuit 32 which operates responsive to the decoding of the proper input data by the signal logic 30. The phase control and strobe circuit 34 sends the appropriate timed strobe pulses to the display board for actuation of the gated lamps. In addition, the input data may contain information as to the bright or dim operation of the lamp on the display board. This data is decoded by the signal logic and transmitted via conductor 36 to a phase control and strobe circuit 34 to further control the timing of the lamp strobe pulses. The display lamps are operated by triac switching devices which connect the appropriate lamps to A.C. power in accordance with the gated coincidence of data in the shift register stages and the strobe pulses from the phase control and strobe circuit 34. By adjusting the timing of the strobe pulses with respect to the phase of the A.C. power, the brightness of the lamps may be controlled in accordance with the input bright-dim data.

As previously mentioned, the primary system 23 for controlling the display board includes a general purpose computer 24 which processes data from various input or storage devices 38, 40, 42 in accordance with formatting programs 44 to register desired displays on the display board 10. A computer useable in the described system consists of a central processor 46 such as a type PDP-8/I from Digital Equipment Corp., a core storage memory or buffer such as Digital Equipment Corp. type 8K-(MM8/IA) and a data break multiplexor 50 such as the Data Equipment Corp. type DMO1. The input devices 38 may comprise a teletypewriter and reader which permits an operator to enter data into the computer in ASCII code in a manner similar to the backup system 26. The storage devices might comprise magnetic tape storage units and/or magnetic disc storage units of any well known type while the graphic reader 40 is a special type unit the design of which will be described hereinafter. The computer can process data to and from the magnetic storage devices 42, the teletypewriter and reader input device 38 and the graphic reader 40, as well as control the data output to the board. Thus, it may be used to prepare and store data for future displays as well as immediate displays and do so on a time sharing basis with the control of the display board in a well known manner.

The control signals from the computer 24 are processed through a computer to board interface logic circuit 52. The interface logic circuit 52 coordinates the board system with the computer to read out the lamp code data signals to the board on the appropriate Lamp Row 1 to 10 conductors. It also provides the address code signals to a computer address select circuit 54 which then transmits Line Shift pulses to the board shift registers of the addressed Line over the appropriate Line Shift 1 through 7 conductor. The computer line blanking circuit 56 controls the operation of the board as a copy changer or traveling message display through the phase control and strobe circuit 34, while the interface logic circuit 52 provides a computer bright/dim signal for controlling the brightness of the display as previously described.

Data for message displays utilizing alpha numeric characters are entered into the computer by an operator at the teletype input device 38. This data may consist of ASCII coded characters which the central processor converts into address and lamp codes in accordance with a formatting program entered from the program input 44. The computer may be formatted to encode any desired matrix configuration for the alpha numeric characters such as 4 x 5, 5 x 7, 6 x 7 etc. However, each lamp code is contained in a 10-bit word, each bit positioned to correspond to a lamp in the column. The individual lamps are either turned on or turned off to form a discrete portion of the characters forming the display in the same manner as the backup system previously described. The computer system differs somewhat from the backup system, however, in that the associated lamp codes for each line are automatically arranged in groups consisting of 120 words each irrespective of the number of characters to form a line in the message. If less than 120 lamp codes are available for a line, then 10-bit words containing zeros in each bit position are automatically added to make up the 120 words required. In addition, five words are provided before the 120 lamp code words for each line to designate the message line address, line blanking, and bright/dim information, as well as any other control data that may be desired. These are actually 11-bit words (which the exampled computer units can handle) with the first of these five added words always containing (1) a message line address in bit positions 1 through 5, (2) a binary 1 or binary 0 in bit position 6 indicating a bright display or a dim display, respectively, and (3) line-blanking data in bit positions 7 through 11. The remaining four additional words specify other control data such as the illuminations of special lights located at various parts of the display area (not shown). The next following 120 words then contain the lamp code words for each of the lamps in the 10 x 120 lamp matrix forming the addressed Line.

The computer-to-board interface logic circuit 52 co-ordinates the operation of the display board with the readout of the data from the computer. It causes the readout of data in groups of 125 words which as indicated provide the display of one line on the display board. Briefly, the board interface logic circuit 52 operates to recognize when the computer has data for display on the board and returns a Signal initiating a 3-cycle data break during which the 125 words are read out. In addition, the circuit co-ordinates the readout of the data with the phasing of the A.C. signals energizing the lamps so as to prevent interference with the triggering of the lamps. Since the primary function of the total system is to create displays on the display board, the computer-to-board interface logic circuit 52 is given first priority to the computer whenever data for the board appears in the core memory 48, and the data break multiplexor 50 appropriately suspends the computer operation with the other peripheral devices 38, 40, 42 during each data break interval readout of a 125 word group.

Graphic Display System

The preferred embodiment of this invention utilizes the general purpose computer 24 as the primary system for controlling the creation of graphic displays on the display board in conjunction with the graphic reader 40. It will be well recognized, however, by those skilled in the art that the computer functions described herein can very well be carried out with hard wire equipment of well known types. The computer reads out the graphic display data to the board in the same 125 word groups of address data, function data, and lamp codes as it does for displaying alpha numeric message displays on the board. The data for the graphic displays, however, is prepared in an entirely different manner than the message display data and, as a matter of fact, different from that used in any other display system known to date.

The graphic display data is prepared by the graphic reader input device 40 which is adapted to scan a drawing or printing of a desired pattern on a program document 58 (FIG. 2) and present electric signals through the graphic reader interface 60 to the computer which in turn properly formats the graphic display data signals into the 125 words groups for each Line 1 through 7 on the display board 10. After the readin of the data signals from the graphic reader to the computer, they may be directed immediately to the display board, or in the alternative, to a permanent storage device 42 such as a magnetic disc or magnetic tape recorder. If a series of graphic displays are to be rapidly displayed to form an animated cartoon, they can be run through the graphic reader and the computer to the permanent storage in the proper sequence to form the animation. They may then be run out of the storage 42 through the computer and the computer-to-board interface logic 52 to the board for display whenever desired. The graphic reader interface 60 performs functions similar to the computer-to-board interface circuit 52 in that it coordinates the readin of the data to the computer in a properly timed operation. It signals the computer when the graphic reader is to provide data and initiates the 3-cycle breaks during which the data is read to the computer.

Figure 2:
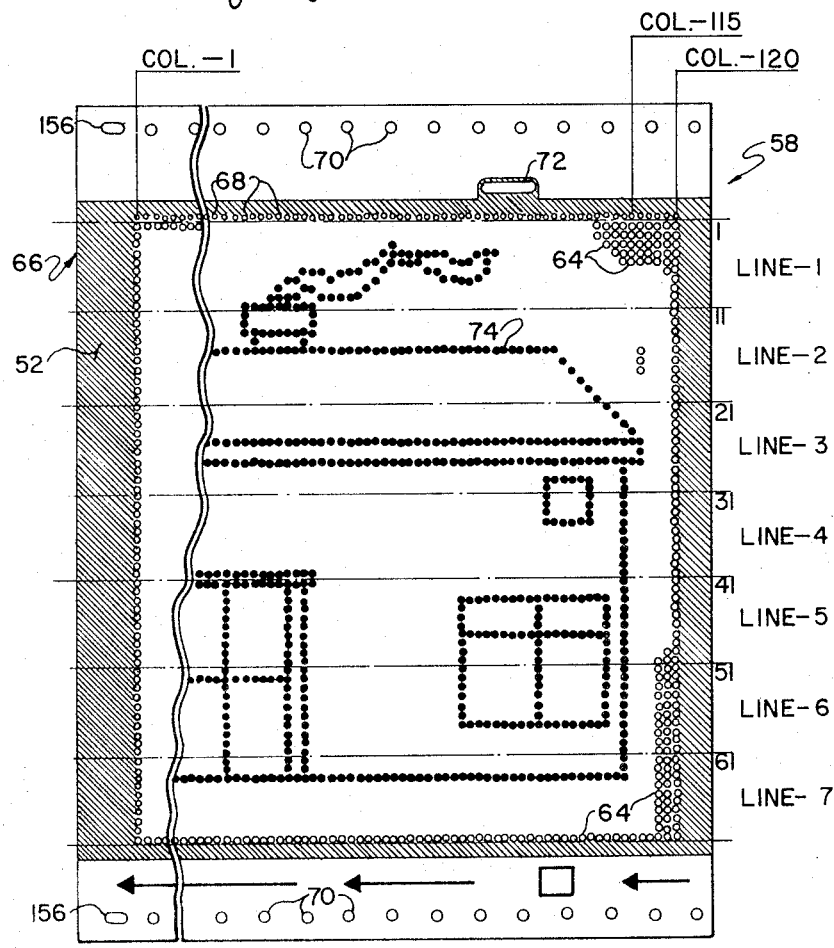
FIG. 2 is an illustrative view of the program document.
Figure 3:
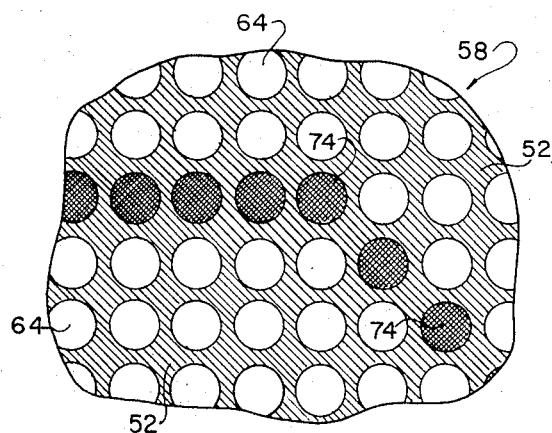
FIG. 3 is an exploded view of a fragmentary portion of the program document.

The program document 58 on which the graphic representation is formed comprises a transparent plastic sheet such as Mylar which has printed thereon an opaque background 52 forming a matrix of transparent scan holes 64. As shown in FIGS. 2 and 3, the matrix of holes are arranged in the same configuration as the matrix of display lamps on the display board 10 with 120 vertical columns and 70 horizontal rows. As will be apparent later, the graphic reader and the computer handle the data in a manner to break up each column of 70 bits into seven 10 word bits so that they can ultimately be arranged into the 125 word groups corresponding to each Line. The opaque background of the program document extends to the leading edge 66 for use in detecting the insertion into the reader 40, and also defines a row of sync holes 68 adjacent the bottom row of the matrix to provide a synchronizing control in a manner to be hereinafter described. It will be noted that each of the sync holes is aligned with a column of the scan holes 64 and somewhat smaller in diameter to insure proper synchronization. A series of aligned holes 70 punched through the Mylar sheet along the upper and lower edges of the program document co-operate with a sprocket wheel in the drive mechanism of the graphic reader to be hereinafter described. Position locating holes 72 are punched adjacent the bottom edge of the document which are designed to fit a standard animation drawing facility such as an Acme peg bar.

The desired display pattern may be drawn directly on the surface of the matrix printed Mylar sheet or on a separate plastic transparency attached to the Mylar sheet as an overlay to form the program document. An opaque paint or ink is used to cover the transparent scan holes 64 required to form the desired graphic display or a printed transparency such as a photograph negative can be used. As an example the graphic display 22 of the house shown on the display board 10 in FIG. 1 can be generated from the drawing 74 of the house on the program document 58 shown in FIG. 2. The lines forming the drawing 74 and covering the matrix scan holes 64 will cause the graphic reader to generate the data to form the exact replication on the display board.

Graphic Reader Construction

The construction of the graphic reader device 40 is shown in detail in FIGS. 4 through 12. The reader is house in a cabinet 80 (FIG. 12) and the document is placed onto a transport plate 76 at the upper front thereof. When the program document 58 is properly inserted with the leading edge 66 in opening 78 formed in the cabinet, a light is lit in scan button switch 82 indicating that the graphic reader 40 is ready to scan the document. The operator presses the scan button 82 actuating a drive mechanism 79 to drive the program document through the machine and into a stacking tray 84 at the rear of the machine, all in a matter of approximately one second. The reader 40 scans the program document a full column of 70 holes at a time starting with COL 1 corresponding to column of lamps COL 1 on the display board and finishing with COL 120. As it does so, the scanning signals are registered and transmitted to the computer in a manner to be described.

The reader 40 ordinarily prepares signals to light the lamps on the display board which correspond to those holes 64 on the document that are covered by the painted pattern 74 on the program document 58. A reverse of that pattern may also be displayed in which all of the lamps on the display board are lit except those corresponding to the holes covered by the painted display pattern 74 on the program document by merely pressing an invert switch 86, the electronic means for performing this function for which will be described later. A power switch 88 is provided on the device for connecting it to a power source and a read lamp 90 is provided which lights when the generated data signals are being transmitted to the computer. The function and operation of each of these control switches and lamps 82, 86, 88 and 90 will be described in more detail later with respect to the associated circuits shown in FIGS. 10 and 11.

Figure 5:
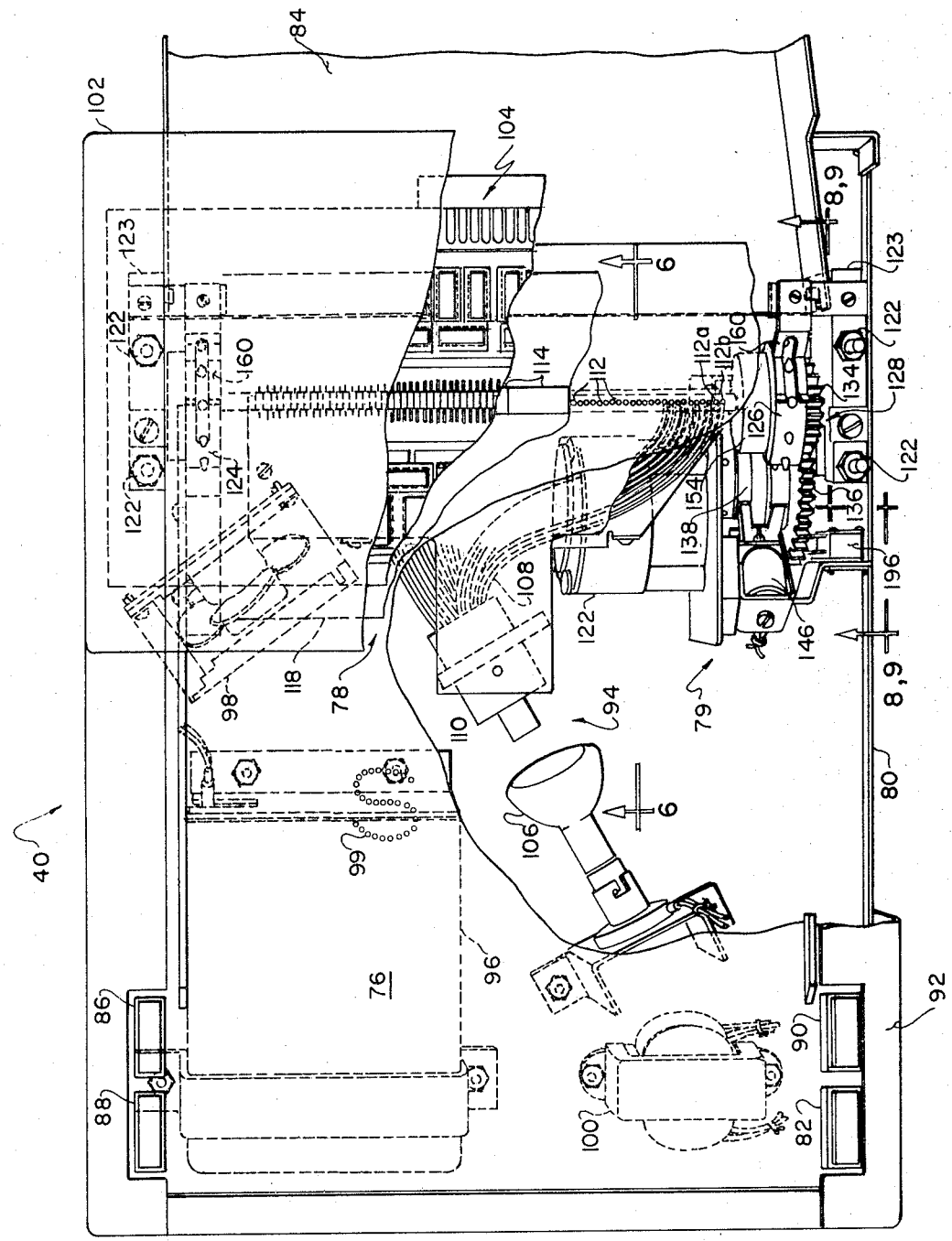
FIG. 5 is a plan view of the graphic reader with a portion of the housing broken away.

The graphic reader housing 80 includes a lower cabinet 92 (FIG. 5) which houses the driving mechanism 79, document illuminating means 94 as well as other electrical components such as a power supply 96, air blower 98 and a transformer 100, all shown in phantom in FIG. 5. The air blower 98 serves to circulate cooling air about the lower cabinet 92 which discharges therefrom through holes 99 in the insertion tray 76. The discharging air serves as a friction reducing medium to facilitate the movement of the program document through the machine. The upper cabinet 102 of the graphic reader housing 80 contains the electrical components and printed circuit board assembly referred to generally as 104 (FIG. 4) which form the scanning means and logic for generating the data signals responsive to the scanning of the program document.

Referring now to FIG. 5, it will be seen that the lighting means 94 comprises a lamp 106 and a fibre optics bundle 108 having one end gathered into a lens assembly 110 which faces the lamp 106. The other end of the bundled optical fibres are arranged to terminate at a line of seventy-two apertures 112 accurately formed in the transport plate 76 across the direction of travel of the program document 58. The apertures 112 are accurately center spaced to coincide with the center spacing of the transparent scan holes 64 on the program document so that light from the lamps 106 will be transmitted through the fibre optics bundle and each uncovered transparent hole 64 of a single column of the program document 58. Thus, there are 70 optical fibres terminating in aligned holes corresponding to the 70 matrix scan holes in the program document plus an additional one 112a for scanning the sync holes 68 in the document as well as a further additional one 112b for detecting the insertion of the leading edge of the program document into the document reader.

A series of photocells in the form of integrated circuit assemblies 114 are accurately aligned to correspond with an associated illuminated aperture 112 in the transport plate 76. That is, a number of photocell assemblies 114 each having nine photocells spaced in accordance with the spacing of the apertures 112 are fixed in a mounting plate 116 as shown in FIG. 6 which also has attached thereto an upper document transport guide 118 at its bottom surface. The close spacing of the upper transport guide 118 and the lower transport plate 76 guide moving document 58 past the scanning means in an accurate manner. The electrical components and printed circuit assembly 104 is secured to the top of plate 116 and is adapted to receive the pins 120 from the photocell assemblies 114. The photocell assembies 114 in the plate 116 are maintained in accurate alignment with the illuminated apertures 112 in the transport plate 76 by means of locating studs 122 (FIGS. 4 and 5) secured to mounting brackets 123 on either side of the lower cabinet and received by suitable apertures in the photocell mounting plate 116.

The program document 58 is transported past the column of aligned illuminated apertures 112 and photocell assemblies 114 by means of the driving mechanism 79 which comprises a motor 122 driving a pair of sprocket wheels 124, 126 through a clutch and gear train 128. The sprocket wheels 124, 126 are interconnected by an axle 130 which is journaled for rotation in bearings 132 (FIG. 7) in the mounting brackets 123. The clutch and gear assembly 128 includes a pinion gear 134 fixed to the sprocket wheel 126, a drive gear 136 and a clutch 138 connected to the drive gear 136 for driving same by the motor shaft 140 when the clutch 138 is engaged.

The clutch 138 is of a well known type having an internal coil spring (not shown) which grabs the motor shaft 140 whenever a lip 142 on its outer periphery is released by an actuator 144 driven by solenoid 146. That is, whenever the solenoid 146 is energized, the actuator 144 is lifted away from clutch lip 142, thus causing the clutch 138 to grab the motor shaft 140 and cause it, along with the drive gear 136, to rotate with it. As will be shown later, the solenoid 146 is momentarily enregized by the operator depressing the scan button 82, thus causing the actuator 144 to release the clutch lip 142. The actuator 144 then falls back to slide on the periphery of the clutch until the lip 142 again engages the actuator 144 to release the clutch. Thus, the clutch 138 and drive gear 136 make one complete revolution responsive to the actuation of the scan switch 82, and the gear tooth ratio between the drive gear 136 and pinion 134 is selected to rotate the sprocket wheels 124, 126 a sufficient number of revolutions to completely drive the program document 58 out of the rear of the graphic reader and into the stacking tray 84.

Figure 8:
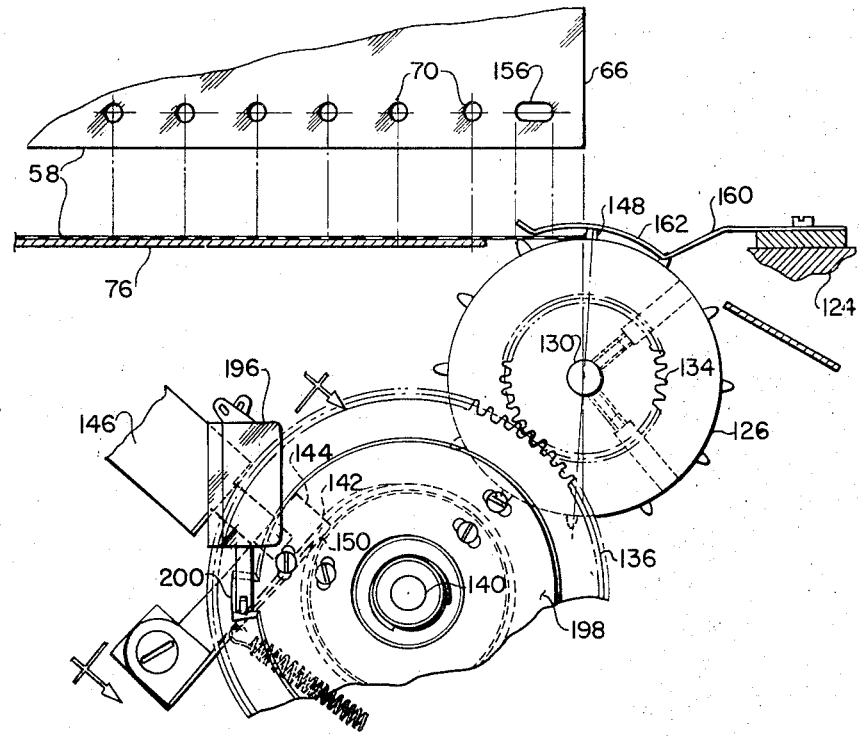
FIG. 8 is a detailed view of the clutch and gear train showing its relationship to the program document at the starting position.

The drive train is designed such that sprocket wheels 124, 126 stop after an operation so that a tapered sprocket 148 ends up in a precise reference position at the top of the wheel as indicated at 148' in FIG. 8. At this position, the sprocket serves as a stop for the leading edge of a program document 58 inserted by the operator, and at this position the light from the illuminated apertures 112 is cut off to the photocells by the opaque background provided along the leading edge 66 of the program document. The cutoff of the light initiates the signals for preparing the computer and signalling the operator to press the scan button to transport the document through the reader.

To insure that the referenced position 148' is always reached by a sprocket on the wheels 124, 126, after a document scan operation special provisions are made to eliminate the effects of slippage within the clutch 138. Because of the slippage between the portion of the clutch to which the drive gear 136 is fastened and the portion of the clutch having the lip 142, a separate pawl 150 actuatable by solenoid 146 is provided which is adapted to fall into a slot 152 in the hub of drive gear 136 at the proper point at the end of a cycle to locate a sprocket at the reference position 148'. The pawl 150 is raised from the slot 152 by the solenoid actuator 144 to release the gear 136 for rotation with the clutch. Because of slippage the gear 136 will lag slightly the portion of the clutch having the lip 142. When the clutch lip 142 reengages the actuator 144, slot 152 will not quite have reached the pawl 150. The gear 136 will continue to rotate, however, by the inertia of the remainder of the train until the pawl 150 drops into the slot 152. To insure that enough inertia is present, a weighted wheel 154 is secured to the axle 130 interconnecting the sprocket wheels 124, 126.

Figure 9:
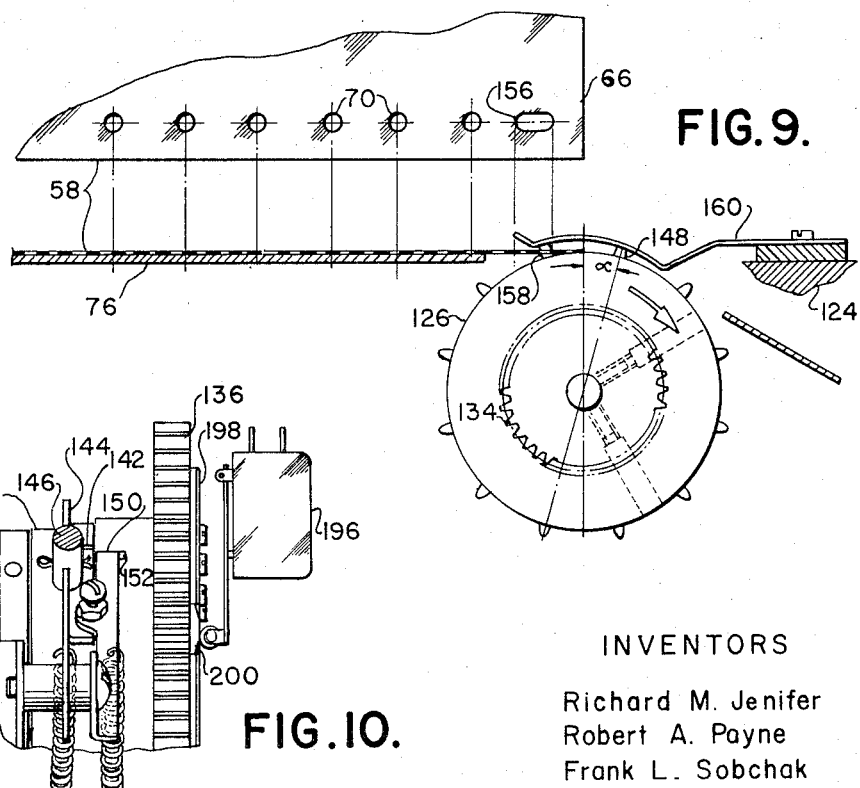
FIG. 9 is a view showing sprocket engagement of the program document.
Figure 10:
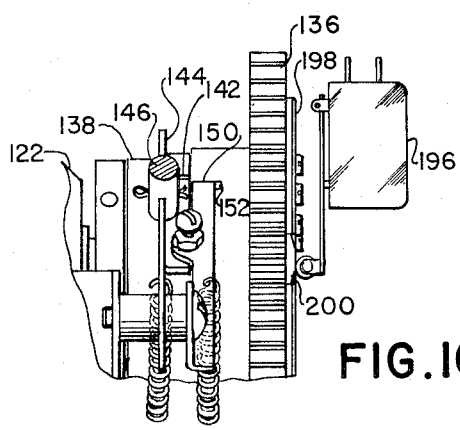
FIG. 10 is a detailed view of the cam and switch operation.

Because of the arrangement by which a sprocket in the reference position 148' serves as a stop for the leading edge 66 of an insert program document 58, the position of the first sprocket holes 156 behind the leading edge is necessarily less than the distance between adjacent sprockets on the wheels 124, 126. Therefore, the sprocket holes 156 are elongated in the trailing direction to facilitate the insertion of the next trailing sprocket referenced 158 in FIGS. 8 and 9 without damaging the program document 58. As can be seen in FIG. 9, the sprocket wheel 126 will rotate through an angle alpha before the sprocket 158 will catch the front edge of the elongated sprocket hole 156 and the enlargement thereof facilitates this initial slippage. As may also be seen in FIGS. 8 and 9, a cantilever spring 160 is provided adjacent the top of each sprocket wheel 124, 126 having a curved portion 162 for engaging the top surface of the program document 58 and hold it against the periphery of the sprocket wheels. The curved portion 162 extends along the periphery of the wheels for a distance at least equal to the spacing between adjacent sprockets 148 at the portion of document travel where the photocells scan the matrix scan holes to insure correct alignment of the document as each column is scanned.

As can be seen the construction of the graphic reader with its drive mechanism insures the speedy but accurate transport of the program documents therethrough for precise scanning of the covered and uncovered markings or holes thereon. The device is very simply operated by an attendant who merely inserts the document until the leading edge 66 engages the sprockets located at the referenced position of 148' and upon a lamp signal that all is ready, depresses the scan switch. The clutch is thereby engaged to complete the drive train between the sprocket wheels and the motor. The document is transported completely through the reader and the sprocket wheels stop at an accurately referenced position for guiding the position of the next inserted document.

Graphic Reader Electric Circuits Description

Figure 13:
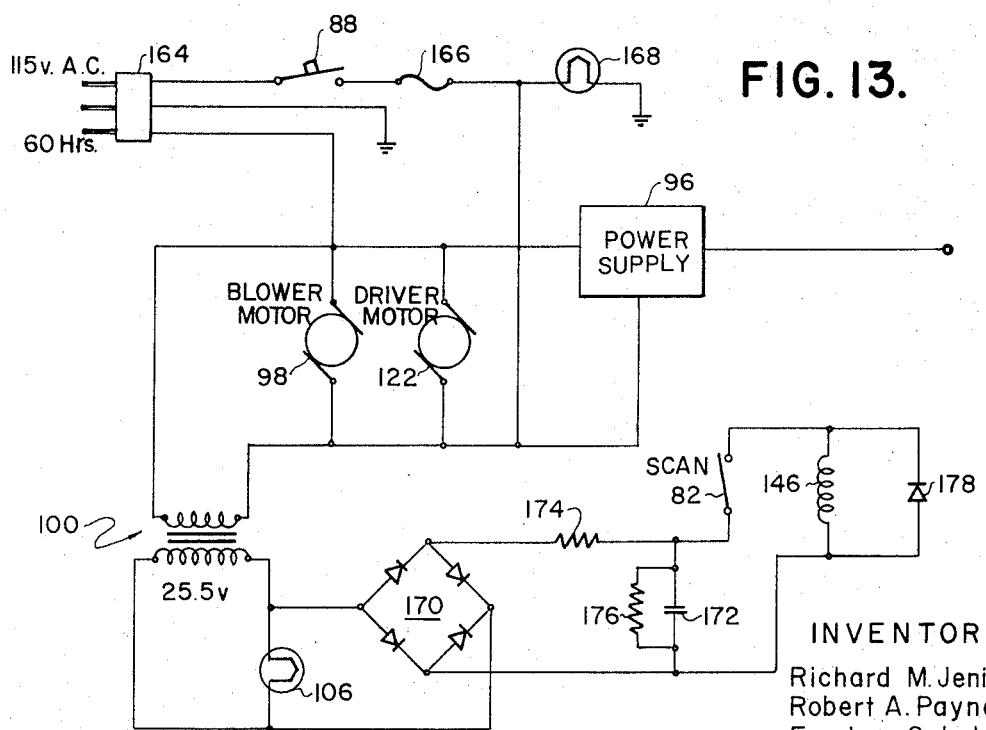
FIG. 13 is a primary power circuit for the graphic reader.
Figure 4:
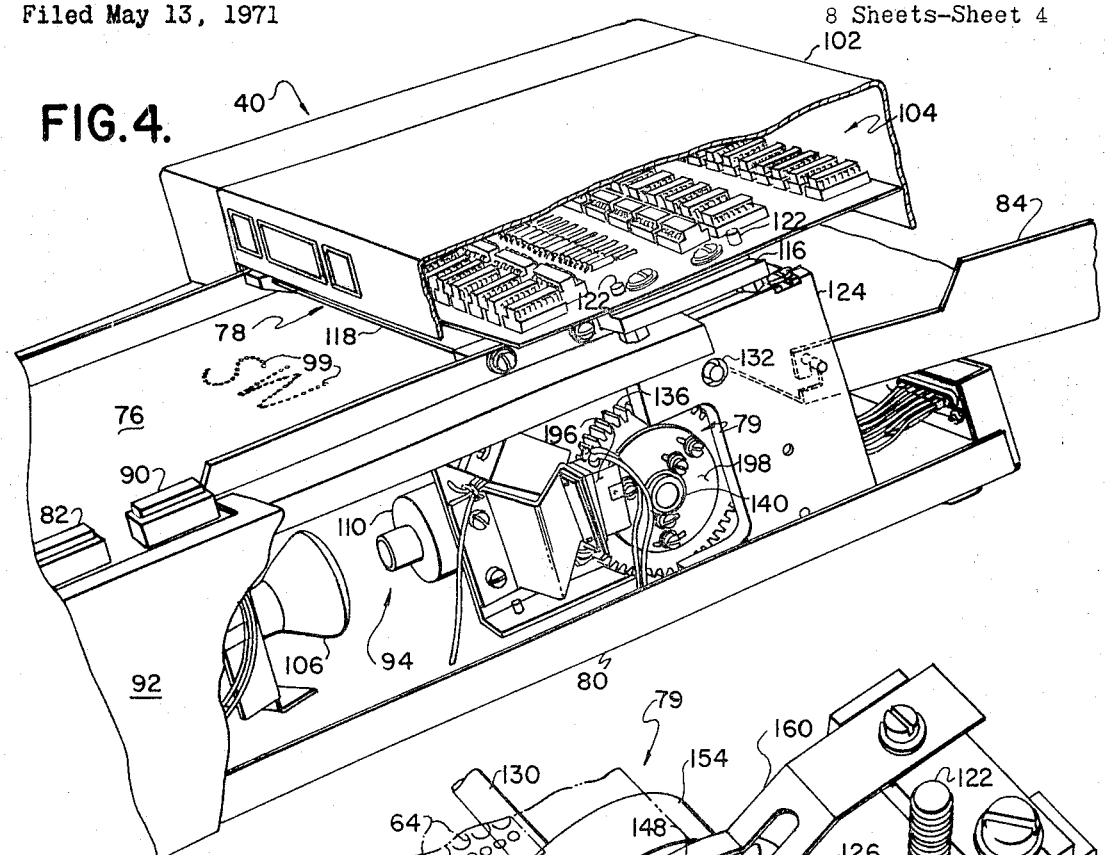
FIG. 4 is a side perspective view of the graphic reader with portions of the housing broken away.
Figure 7:
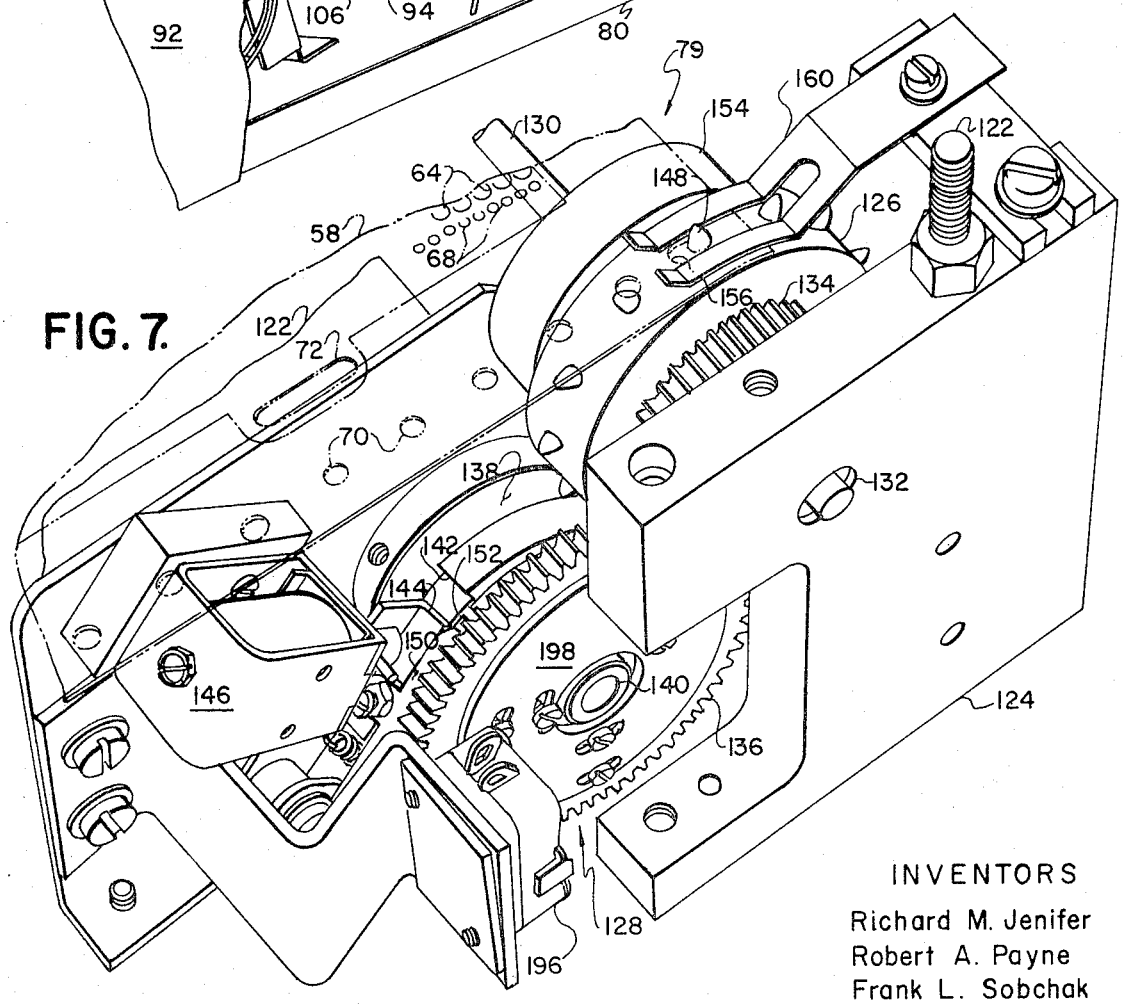
FIG. 7 is a detailed view of the complete mechanical drive mechanism.

Reference is now made to FIG. 13 which shows the power circuit for the graphic reader. The power switch 88 closes the power circuit from a plug 164 connectable to a 115 volt A.C. single phase source through fuse 166 to the parallel connected power supply 96, document drive motor 122 air blower motor 98 and transformer 100. It also completes the connection for a power indicator lamp 168 which is contained inside the power button switch 88. The power supply 96 provides a low level D.C. voltage, such as 5 volts, at its output to be used in the integrated circuits forming the logic shown in FIG. 11. The transformer 100 on the other hand provides a lower level A.C. voltage of for example 25.5 volts, for the control circuit to actuate the clutch in the program document drive train. A full wave diode rectifier 170 has its input connected across the transformer secondary and its output connected to a circuit for energizing the solenoid 146 by means of the scan switch 82. This circuit includes a capacitor 172 which charges up to the peak value voltage supplied by the voltage dividing action of resistors 174 and 176. When the scan switch 82 is depressed by the operator, responsive to the signal that the reader and the computer are ready, it discharges rapidly through the solenoid 146 to engage the clutch and complete the drive train between the constantly energized drive motor 122 and the sprocket wheels. Diode 178 provides a path for the current generated by the back EMF of the solenoid coil when the switch 82 is opened. The scanning lamp 106 which provides the illumination to the scanning holes 112 via the fibre optics bundle 108 is also connected directly across the secondary of the transformer.

Figure 11:
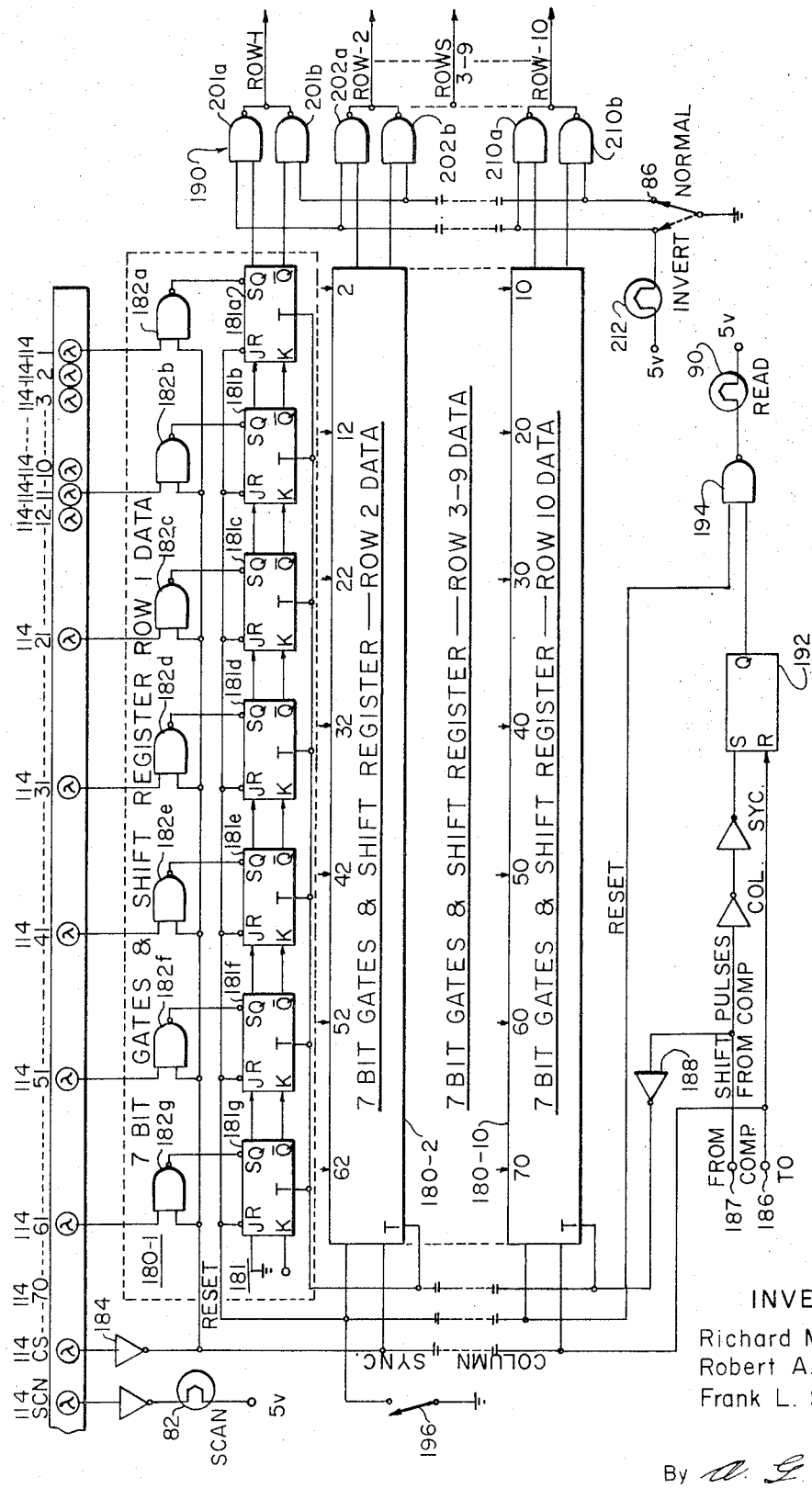
FIG. 11 is a block diagram of the electrical circuits.
Figure 12:
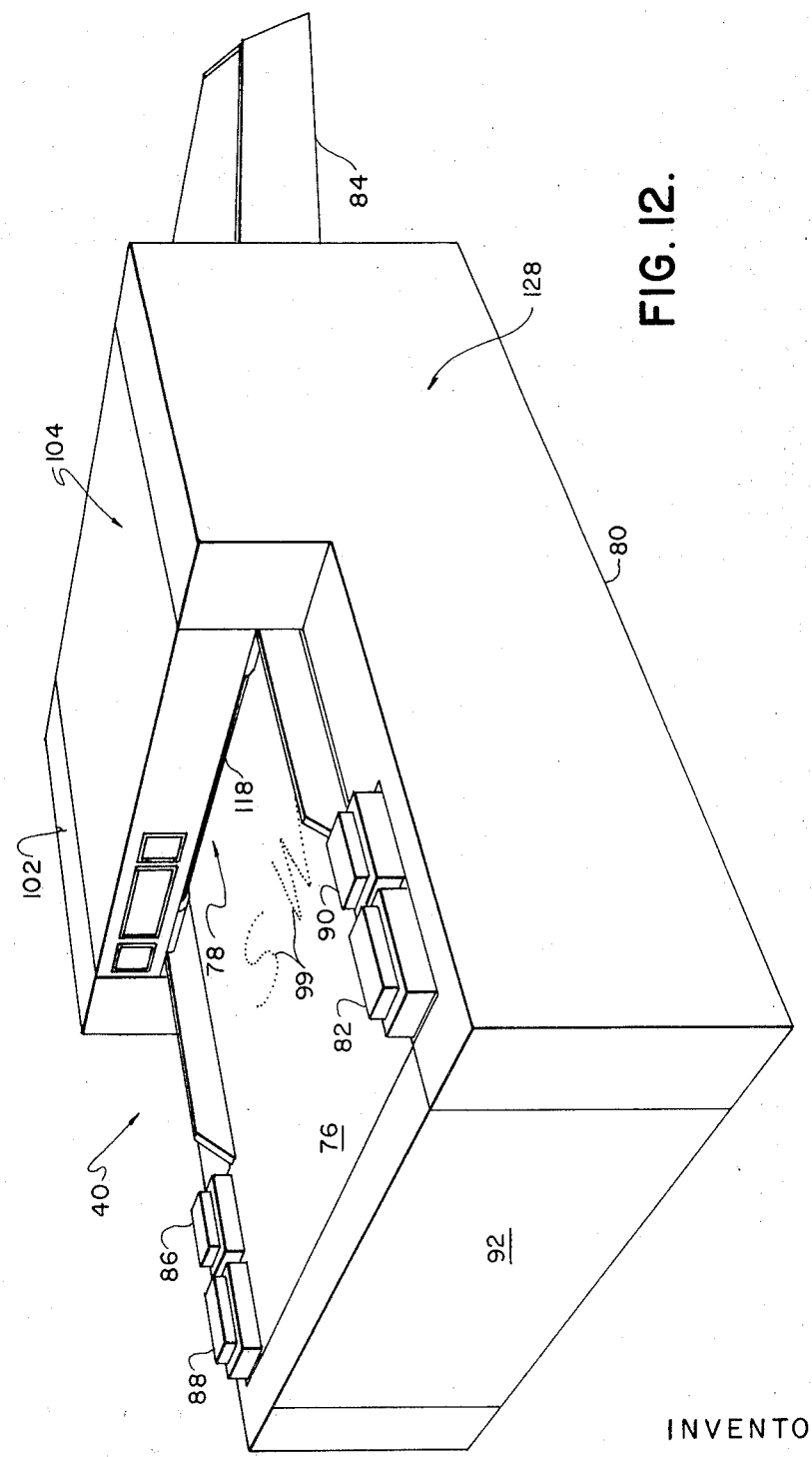
FIG. 12 is an external view of the graphic reader.

The logic circuits for handling the lamp code data signals as they are generated by the photocells and read out to the display system are shown in FIG. 11. The photocells in the assemblies 114 are shown schematically at the top of the figure, with the individual photocells (referenced 114-1, 114-2 ... 114-70) forming a single column of scanning elements to simultaneously scan the seventy transparent scan holes 64 forming one complete column on the program document 58 at a time. It will be recalled, however, that the lamp code data is to be transmitted to the board one Line at a time in 120 lamp code word groups representing the 120 columns and 10 rows forming each Line. It is therefore the function of the graphic reader logic and the remainder of the system to rearrange the order of the data from the 70 bit groups simultaneously generated by the graphic reader photocells scanning each total matrix column to the 120 lamp code word groups in the sequential order Line 1 through Line 7.

The first reordering of the data is accomplished in the 7-bit gate and shift register units 108-1, 180-2 ... 180-10. The gate and shift register units 180-1 through 180-10 are identical and therefore the details of the unit 180-1 only is shown. Each one comprises a shift register 181 having seven stages 181a through 181g and are interconnected with the photocells 114 through gates 182a through g so that each register is associated with a particular row bit in a lamp code word and each like stages of the registers is associated with a particular matrix Line 1–7 on the board. Thus, the set input of the first stage 181a of the row 1 data gate and shift register unit is connected to a Nand gate 182a which has one input connected to the first photocell 114-1 forming the scanning column. The second stage 181b of the row 1 shift register 181 is connected to Nand gate 182b which has an input connected to the eleventh photocell 114-11 in the column of scanners. Likewise, the remaining stages 181c, 181d, 181e, 181f and 181g are associated through the respective Nand gates 182c through g to the twenty-first, thirty-first, forty-first, fifty-first and sixty-first photocells, and as may be seen in FIG. 2, these are associated with the top scanning holes of each group of ten forming a display Line 1 through 7 group. The second gate shift register unit 180-2 has its shift register stages and associated Nand gates connected to the second, twelfth, twenty-second, thirty-second, forty-second, fifty-second and sixty-second photocells, whereas the last of the gate and shift register units 180–10 has its stages connected to the tenth, twentieth, thirtieth, fortieth, fiftieth, sixtieth and seventieth photocells in the column as indicated in FIG. 11. The second inputs to all of the Nand gates in all of the gate shift register circuits are connected through an inverter 184 to a column Sync photocell 114–CS which is located to scan the sync holes 68 on the program document. As previously mentioned, each sync hole 68 is aligned with a column of scanning holes 64 so that as the photocell 114–CS detects each sync hole, the marked or unmarked condition of all of the scanning holes 64 in the corresponding column on the program document are simultaneously read into the seventy associated shift register stages.

The Column Sync signal from photocell 114–CS is also applied through the graphic reader interface to the computer via terminal 186 to indicate that the graphic reader has data for entry into the computer. It initiates the 3-cycle data break during which the computer is conditioned to receive the graphic reader data. Thus, responsive to the column sync signal the computer transmits seven shift pulses to the graphic reader via terminal 187 which are applied through an inverter 188 to the trigger inputs of each of the shift register stages in each of the gate and shift register units 180–1 through 180–10. The data in the registers is read out one 10-bit lamp code word at a time through the gates 190 to the computer in the sequential order as they pertain to Lines 1 through 7 on the board. The computer shift pulses are also provided to the set input of a flip-flop 192, the output of which is transmitted through Nand gate 194 to actuate the read lamp 90 indicating to the operator that the data is being read out. The flip-flop is reset by each Col Sync signal so the Read lamp 90 will flash as each column of data is read from the program document.

An additional photocell 114–SCN is provided in the reader which serves the purpose of detecting when the leading edge of the program document is inserted into the graphic reader and notifying the operator by lighting the scan light 82. Hence, the photocell 114–SCN ordinarily is subjected to the light from its associated illuminated hole 112, with no document inserted and its output is low to provide a high to the scan light 82 maintaining it extinguished. The opaque leading edge of the program document interrupts the light path, however, to place ground on the scan lamp, thereby energizing it.

A reset switch 196 is provided for resetting all of the shift register stages after the complete readout of a program document. This switch is operated automatically by a cam arrangement in the drive mechanism 128 as may best be seen in FIGS. 8 and 10. A cam plate 198 is secured to the drive gear 136 which as a cam lobe 200 which interacts with the reset switch 196. As will be recalled, the drive gear 136 makes one full turn to scan a program document so that the cam lobe 200 resides in a home position to close the switch 196 at the end of each rotation. However, it opens at the start of each scan cycle and remains open during the time that the gear 136 is rotating to release the shift register stages for operation.

The data is read out of the registers to the rest of the display system through one or the other of the power gate pairs 201a and b through 210a and b. These gates are connected at their other inputs to the invert switch 86 which is a single pole double throw type having its switch arm connected to ground. Thus, when the switch 86 is in its normal condition as shown, the data flows through the power gates 201a through 210a to indicate that the lamps associated with the drawn lines 74 on the program document are to be lit with the remaining lamps unlit. When the switch 86 is in its opposite or invert position, the data flowing from the power gates is just the opposite, indicating that all of the lamps are to be lit except those associated with the covered holes on the program document. In the invert position of the switch, a lamp 212 therein is lit to indicate same by the obvious connection of the lamp 212 to ground.

The data flowing to the computer from the graphic reader is arranged in ten bit lamp code words arranged in a column-by-column sequence Line 1, Col–120; Line 2 Col–120 . . . Line 7 Col–120; Line 1 Col–119, . . . Line 7, Col 119; Line 1, Col–118 . . . Line 1, Col–1; Line 7, Col–1. This data sequence is further rearranged in the computer 24 to facilitate the Line-by-Line read-in of the lamp code data words required by the display board. This is easily accomplished after the data has been read into the core memory 48 of the computer by means of a graphic display format program which calls for the readout from the core memory to the display board or to a storage device 42 in the proper sequence. Since the word storage elements in a computer core memory are ordinarily randomly accessible, a program can easily be developed to read out the data in the 120 word groups each of which is preceded by the five addressing and control words in a manner well known in the art.

It will also be recognized by those skilled in the art that the formatting can be easily accomplished by hard wired equipment which is readily available on the market. There are many core memories which are randomly accessible and can be hard wired to read out the data words in a desired sequence. Circuits for generating address data are also well known and one such type which could be readily adapted for use by a skilled artisan is shown in the aforementioned Gardberg et al. patent application.

While there has been shown a preferred embodiment incorporating the teachings of this invention, it is recognized that many modifications and additions may be made thereto without deviating from the material elements of the invention. It is therefore intended to be bound only by the scope of the appended claims.

What is claimed is:
1. A system for forming a desired display pattern on a display board having a matrix of display elements arranged in rows and columns comprising;
 a program document having a like matrix of optically sensible markings arranged in rows and columns and having a replication of said desired pattern formed thereon covering the markings required to form said display pattern with each column of said markings adapted to be scanned in sequence in response to movement of said document in one direction,
 said program document having a plurality of spaced series of equispaced sprocket holes along the length thereof extending along said direction of movement with the first hole of each series being elongated along said one direction,
 a program document reader comprising means for receiving an inserted program document,
light source means including a series of fibre optics parallel to each column of markings for illuminating a single column of markings transverse to the direction of said movement,
a series of photocells parallel to each column of markings and aligned with said fibre optics for scanning the markings of each column of said inserted program document in sequence to provide electric signals in accordance with the covered and uncovered markings thereon for correspondingly controlling said display elements,
a motor,
a wheel for each series of sprocket holes with each wheel having a plurality of tapered sprockets equispaced along each wheel periphery for sequential engagement with the respective sprocket holes to move said document in said one direction with the space between one sprocket of each wheel and said first hole determined by the engagement of the leading edge of said document and the tapered surface of said one sprocket,
clutch means for engaging said motor with said sprocket wheels to drive said sprocket wheels to move said document with each column of said markings in sequence past said photocells,
means for signalling engagement of the leading edge of said document with each said one sprocket,
manually operable electromagnetic means normally controlling said clutch means too disengage said motor from said wheels and operable to control said clutch means to engage said motor with said wheels for driving said wheels through only a predetermined distance and thereafter disengaging said motor from said wheels while the inertia of said wheels maintains wheel movement,
means operated by said operated electromagnetic means for holding said wheels against movement until after said clutch fully engages said motor with said wheels and for stopping said wheels after said clutch disengages said motor from said wheels to thereby locate each said one sprocket in a predetermined position to engage the leading edge of an inserted program document,
and means responsive to said electric signals for operating the display elements on said display board to form the desired pattern.
2. In the system of claim 1 wherein said series of photocells is aligned adjacent the leading edge of a program document inserted to said reference position,
 and wherein a spring clip is positioned to engage the program document adjacent the periphery of said sprocket wheel along a distance at least equal to the peripheral spacing between two sprockets to accurately align said program document as it moves through the scanning means.

References Cited

UNITED STATES PATENTS

| | | | |
|---|---|---|---|
| 2,123,459 | 7/1938 | Anderson | 340—339 |
| 3,576,430 | 4/1971 | Fickenscher et al. | 235—61.11 E |
| 3,636,316 | 1/1972 | Suzuki et al. | 235—611. E |
| 3,432,846 | 3/1969 | Jones et al. | 340—339 |
| 2,695,379 | 11/1954 | Myers et al. | 340—339 |
| 3,636,553 | 1/1972 | Hancock | 340—339 |
| 3,508,244 | 4/1970 | Warren | 340—339 |

JOHN W. CALDWELL, Primary Examiner
M. M. CURTIS, Assistant Examiner

U.S. Cl. X.R.

178—42; 235—61.11 E